United States Patent [19]

Scegiel et al.

[11] Patent Number: 4,722,106
[45] Date of Patent: Feb. 2, 1988

[54] BEEHIVE LIFTING DEVICE

[75] Inventors: Mark J. Scegiel, Crown Point; John R. Hicks, Larwill, both of Ind.

[73] Assignee: Stow-A-Crane Division, Valparaiso, Ind.

[21] Appl. No.: 852,782

[22] Filed: Apr. 16, 1986

[51] Int. Cl.⁴ ............................................. A01K 55/00
[52] U.S. Cl. ...................................... 06/12 R; 294/169
[58] Field of Search ................ 6/12 R, 12 M; 294/15, 294/62.3, 81.3, 158, 159, 164, 167, 169

[56] References Cited

U.S. PATENT DOCUMENTS 2,108,480  2/1938  Foster .................................... 6/12 R
2,255,633  9/1941  Wagner ................................ 294/169
4,573,228  3/1986  Bachalo ................................. 6/12 R
4,577,897  3/1986  Mazac .............................. 294/169 X Primary Examiner—Robert P. Swiatek
Attorney, Agent, or Firm—Wendell E. Miller

[57] ABSTRACT

A beehive lifting device (10) lifts beehives (106) by engaging handholds (124). As the beehive (106) is lifted by the lifting device (10), the relationship between the load lifting point (51) and the center of gravity (110) of the beehive (106) causes the beehive lifting device (10) to tilt backward, and causes the beehive (106) to tilt backward toward, or against the folding frame (12) of the beehive lifting device (10). The beehive lifting device (10) is foldable either into a flat package that is disposed parallel to a fourth plane (94) or into a compact bundle that is disposed substantially around an axis (98).

25 Claims, 5 Drawing Figures

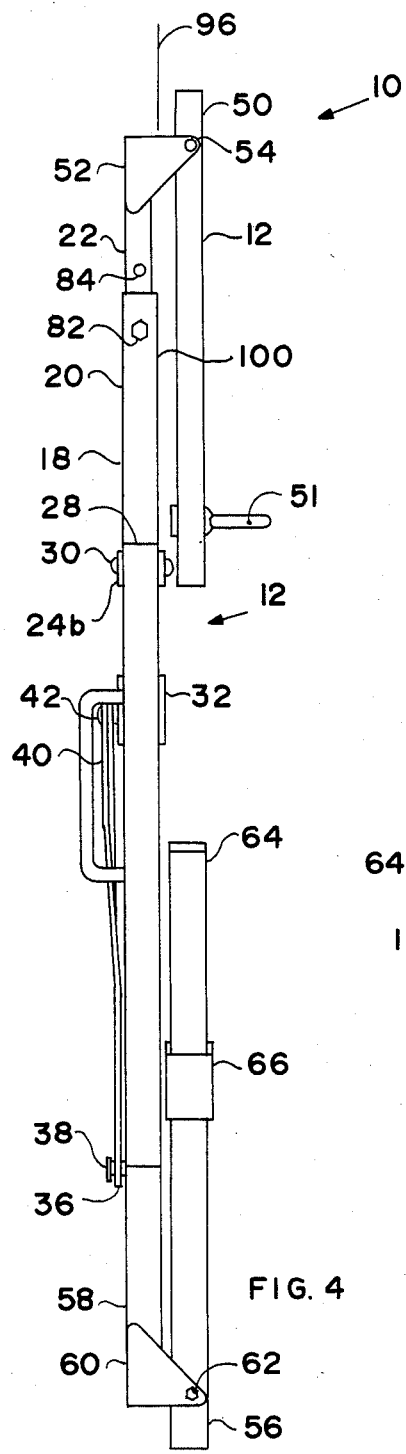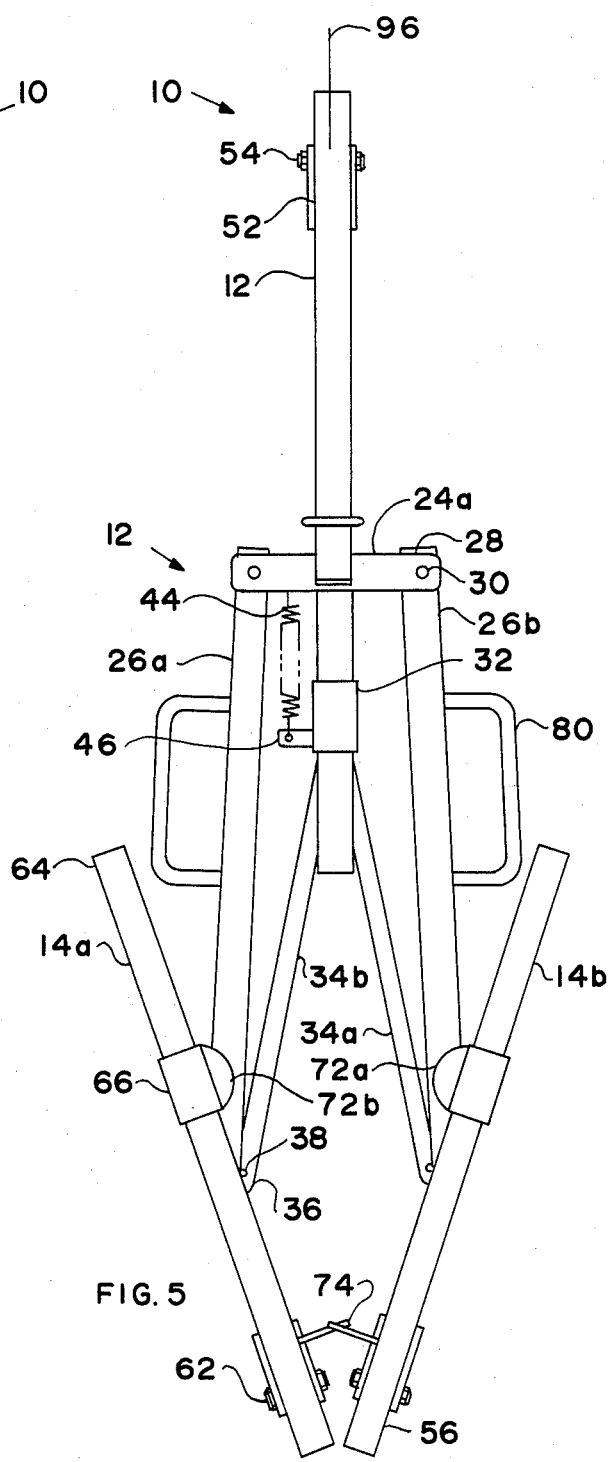

BEEHIVE LIFTING DEVICE

BACKGROUND OF THE INVENTION

1. Field of the Invention

The present invention relates generally to lifting devices for use with a crane; and, more particularly, the present invention relates to a lifting device for beehives.

2. Description of the Prior Art

Honey is a nutritious food and is preferred by many as sweetener. In addition, pollination by bees is important to successful production of fruit and some other foods.

In beekeeping, a beehive includes a lower box-type structure that provides a brood chamber for the bees, and a plurality of additional box-type structures, or supers, that are stacked onto the brood chamber. Honey is taken from the supers for human consumption; but the honey in the brood chamber is left to provide food for the bees during seasons when nectar is not available to them.

Some beekeepers provide pollination for fruit growers over a rather wide geographical area. To provide this pollination service means that beehives, each complete with a swarm of bees, and perhaps partially filled with honey, must be lifted onto a truck to be transported to the fields that are to be pollinated.

Further, even when a beekeeper does not provide a pollination service for others, the keeping of bees requires lifting supers that are filled with honey.

Barnes, in U.S. Pat. No. 4,392,679, discloses a device for clamping the various sections of beehives together and then transporting the beehives manually by a pole that is carried on the shoulders of two men.

Kruse, in U.S. Pat. No. 2,678,744, discloses a two wheel dolly for handling beehives. A manually actuated hoist is included for lifting individual sections or several sections of the beehives from the brood chamber.

It is apparent that neither Barnes nor Kruse provides a suitable method of handling beehives where loading of beehives on trucks is involved. Further, it is apparent that neither device is adaptable to the mechanization that is required to reduce the labor content in beekeeping.

Kugler, in U.S. Pat. No. 3,427,066, discloses a lifting device which includes lifting lugs than engage handhold slots in fruit packing boxes. While the fruit box lifting device of Kugler is superficially similar to the beehive lifting device of the present invention, it lacks many of the important features of the present invention, as will be obvious from the detailed description of the present invention.

SUMMARY OF THE INVENTION

The beehive lifting device of the present invention includes a folding frame and a pair of lifting arms that are parallel and spaced apart from each other, that are attached to the folding frame near the bottom thereof, and that extend orthogonally outward from the folding frame.

A pair of lifting lugs are attached to respective ones of the lifting arms distal from the folding frame, extend inwardly from respective ones of the lifting arms, and intercept a first plane.

A boom includes an attaching portion that is attached to the folding frame proximal to the upper end thereof; and the boom includes a load lifting point that extends orthogonally outward from the folding frame.

The boom is disposed generally in a second plane that is orthogonal to the first plane and that bisects the distance between the lifting lugs; and the boom is disposed generally in a third plane that is parallel to the first plane and that is spaced above the first plane.

The folding frame is disposed generally in a fourth plane that is orthogonal to the first, second, and third planes.

The folding frame includes a first frame member and first and second frame arms. The first frame member is disposed generally along a first axis that is located at the intersection of second and fourth planes. The first and second frame arms are disposed generally in the fourth plane, include upper ends that are pivotally attached to the first frame member, and include lower ends that are pivotally movable inward and outward, generally in the fourth plane, thereby providing a means for changing the distance between the lifting arms and the lifting lugs that are attached thereto.

The folding frame includes a pair of equalizer links, The lower ends of the equalizer links are pivotally attached to respective ones of the lifting arms distal from the upper ends thereof; and the upper ends of the equalizer links are guided for movement parallel to the first axis by means of a slide that slidably engages the first frame member. Thus, the equalizer links provide for equal pivotal movement to the frame arms with respect to the second plane, and serve to maintain substantially equal distances between the lifting lugs and the second plane wherein the lifting boom is disposed.

The boom is pivotally attached to the first frame member and is foldable downward and substantially against the first frame member and the frame arms; and the lifting arms are pivotally attached to respective ones of the frame arms and are foldable upwardly and substantially against the frame arms. Thus, the beehive lifting device is foldable generally into a single plane.

Or, the beehive lifting device is foldable into a bundle that is disposed generally along the first axis, and generally around the first axis. This folding of the beehive lifting device into a bundle is accomplished by: the frame arms being pivotally moveable toward the second plane and the first axis therein, the lifting arms being moveable toward the second plane because of being attached to respective ones of the frame arms, the lifting arms being foldable toward the fourth plane and the first axis therein, and the boom being foldable downward along the first axis.

The beehive lifting device includes two separate means for resiliently clamping the lifting arms against the sides of the beehive. One clamping means includes a spring that resiliently forces the lifting arms inwardly. The other resilient clamping means includes the weight of the beehive and a clamping force that is a function of the weight of the beehive and the distance between one of the lifting arms and the pivotal attachment of the upper ends of the respective one of the frame arms to the first frame member.

Further, the beehive lifting device of the present invention includes two separate means for stabilizing the beehives as they are lifted. These two separate means for stabilizing the beehives can be used separately; but preferably, they are used together.

One means for stabilizing the beehives as they are lifted and transported by the present invention is to tilt the beehives backward toward, or against, the folding frame. This stabilization is provided by positioning the load lifting pointing of the boom outward from the folding frame a greater distance than the lifting lugs. Thus, when a beehive is lifted, the center of gravity of the beehive is closer to the folding frame than the lifting force, the bottom of the folding frame swings outwardly until the center of gravity of the beehive is below the load lifting point, the top of the beehive tilts backward toward, or against, the folding frame, and this tilting backward of the beehive results in the bottom of the folding frame swinging outwardly until the combined center of gravity of the load lifting device and the beehive is directly below the load lifting point.

The other means for providing stability is the resilient clamping of the lifting arms against the sides of the beehives, as described above, and resultant friction between the lifting arms and the beehive.

It is an object of the present invention to provide a beehive lifting device that can be folded into a compact package that is disposed generally along a single plane.

It is another object of the present invention to provide a beehive lifting device that can be folded into a compact bundle that is disposed generally around a single axis.

It is another object of the present invention to provide a beehive lifting device in which the distance between load lifting lugs is adjustable, and the load lifting point remains in a plane that is orthogonal to a plane that intercepts the lifting lugs, and that bisects the distance between the lifting lugs.

It is another object of the present invention to provide a beehive lifting device in which the weight of the beehive provides a clamping force that resiliently urges the lifting arms inwardly against the beehive.

Finally, it is an object of the present invention to provide a beehive lifting device in which stability for the beehive is provided by automatically tilting the beehive backward toward, or against, the folding frame.

BRIEF DESCRIPTION OF THE DRAWINGS

FIG. 4 is a front view of the beehive lifting device of FIG. 1, showing the beehive lifting device folded into a compact bundle; and FIG. 5 is a side view of the beehive lifting device of FIG. 4, showing the compact bundle of FIG. 4.

BEST MODE FOR CARRYING OUT THE INVENTION

Figure 1:
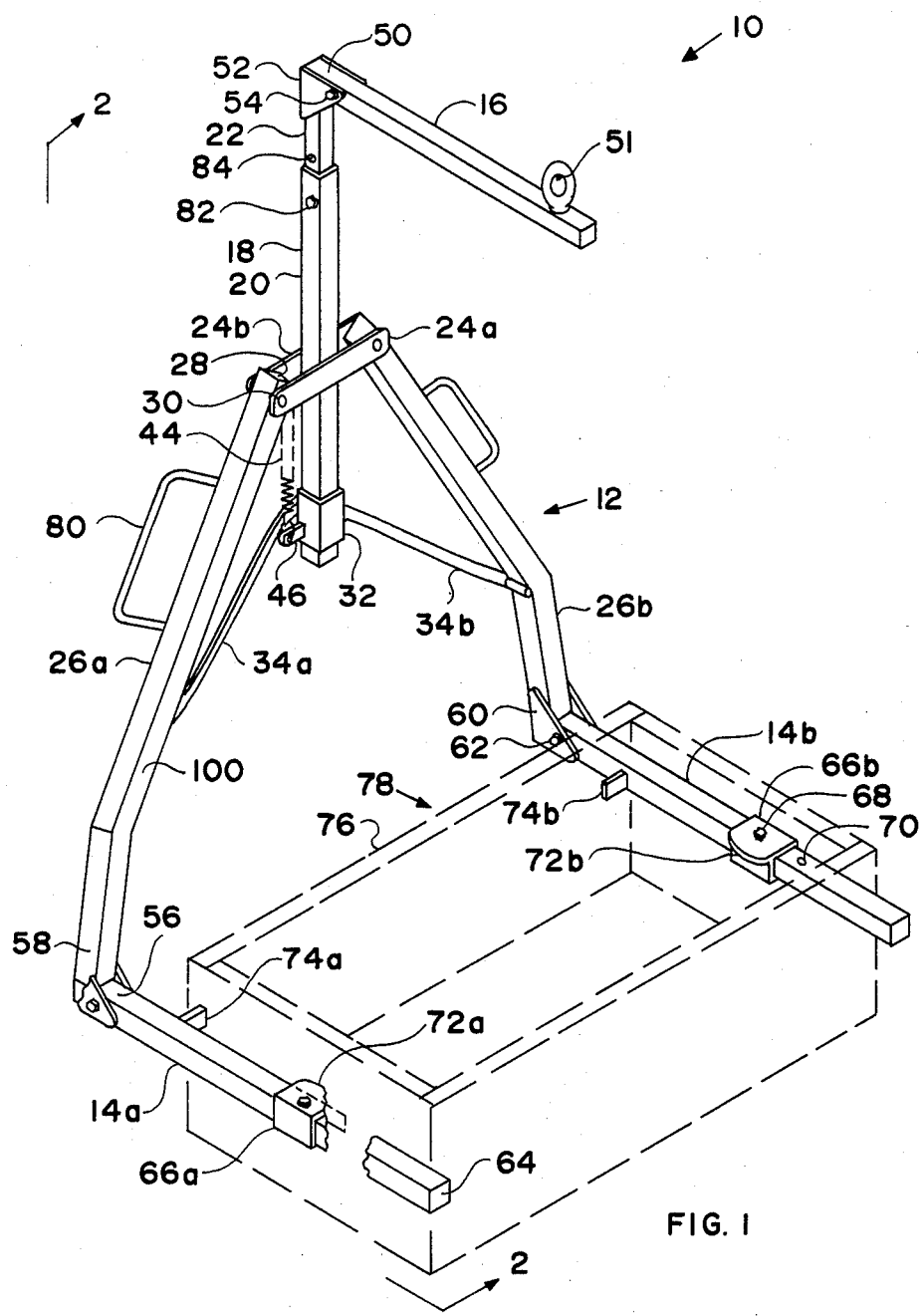
FIG. 1 is a perspective view of the beehive lifting device of the present invention, showing one section of a beehive in phantom lines.
Figure 2:
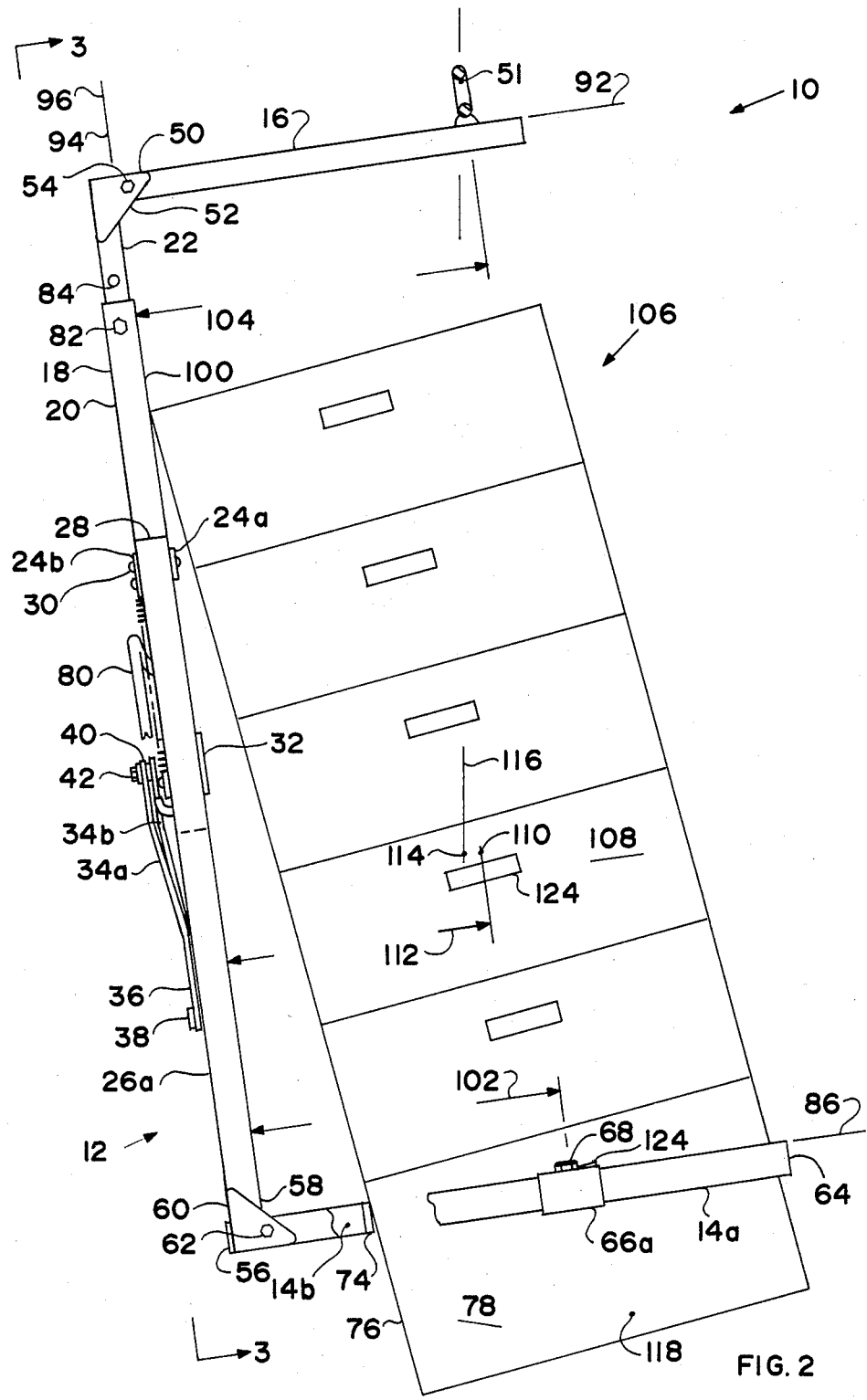
FIG. 2 is a side elevation of the beehive lifting device of FIG. 1, taken substantially as indicated by view line 2—2 of FIG. 1, showing a beehive being supported by the lifting lug, the folding frame of the beehive lifting device tilted backward, and the beehive stabilized by being tilted back against the folding frame.
Figure 3:
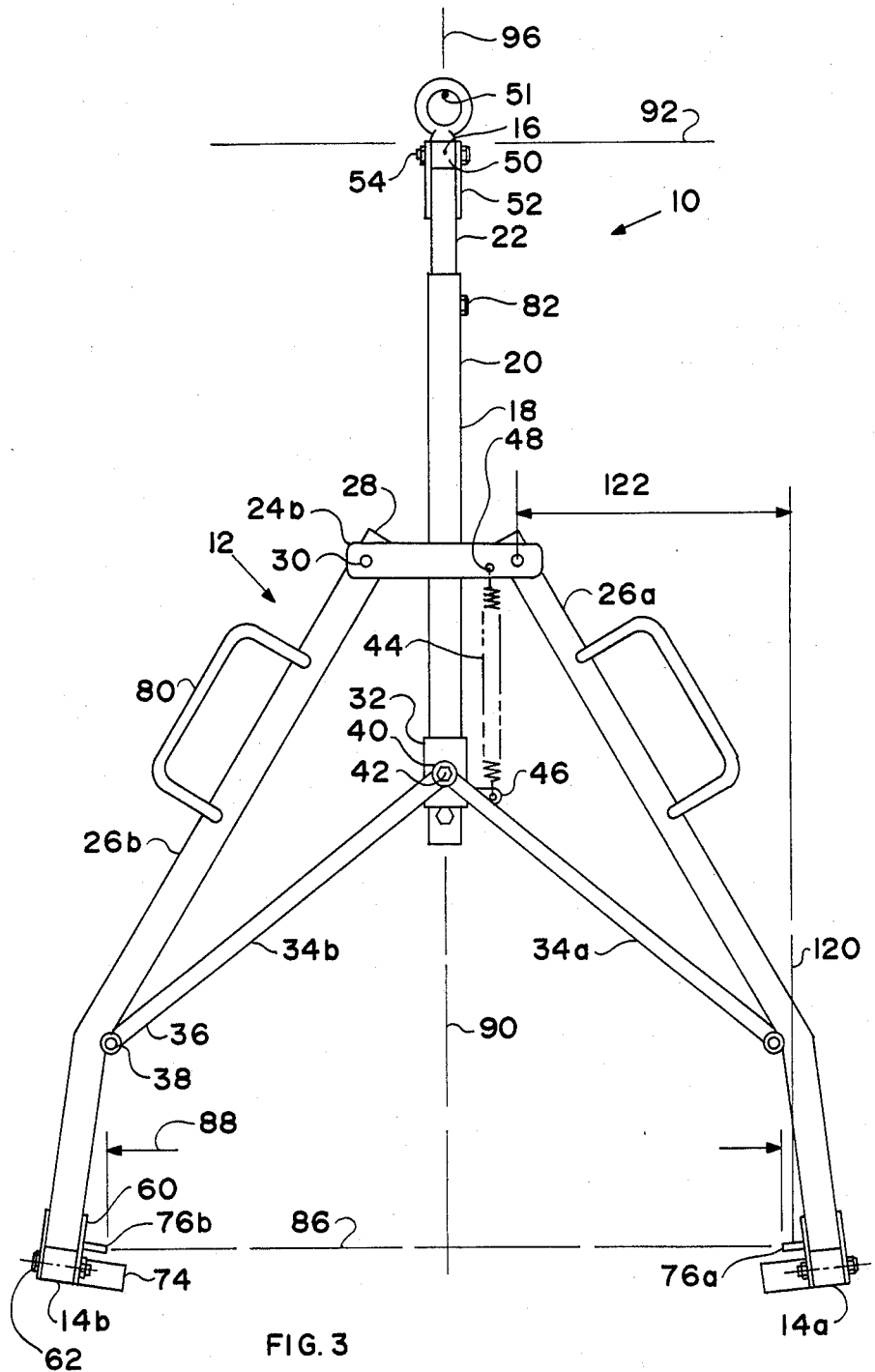
FIG. 3 is a back elevation of the lifting device of FIG. 1, taken substantially as indicated by view line 3—3 of FIG. 2.

Referring now to the drawings, and more particularly to FIG. 1-3, a beehive lifting device 10 includes a folding frame 12, lifting arms 14a and 14b, and a boom, or load attaching member, 16.

The folding frame 12 includes a first frame member 18. The first frame member 18 includes a square outer tube 20, a square inner tube 22 that is slideably inserted into the outer tube 20, and cross arms 24a and 24b that are fixedly secured to the outer tube 20.

The folding frame 12 further includes frame arm 26a and 26b that are pivotally attached, proximal to upper ends 28 thereof, to the cross arms 24a and 24b by pins 30, a slide member 32 that is slidably installed over the outer tube 20, equalizer link 34a and 34b whose lower ends 36 are pivotally attached to respective ones of the frame arms 26a and 26b distal from the upper ends 28 thereof by pins 38, and whose upper ends 40 are pivotally attached to the slide member 32 by bolt 42, and a tension spring 44 that is attached to a lug 46 of the slide member 32, and to a hole 48 in the cross arm 24b.

The boom 16 includes an attaching portion 50 and a load lifting point 51. The attaching portion 50 is pivotally attached to the inner tube 22 of the first frame member 18 by a pair of clevis plates 52 that are fixedly attached to the inner tube 22, and by a pin 54 that extends through both of the clevis plates 52 and the attaching portion 50 of the boom 16; so that the boom 16, and the attaching portion 50 thereof, is foldable downward along the first frame member 18.

The lifting arms 14a and 14b include inner ends 56 that are pivotally attached to lower ends 58 of respective ones of the frame arms 26a and 26b by pairs of clevis plates 60, and by pins 62 that extend through respective pairs of the clevis plates 60 and respective ones of frame arms 26a and 26b; so that outer ends 64 of the lifting arms 14a and 14b are foldable upwardly against the folding frame 12.

Lug members 66a and 66b are slidably installed over respective ones of the lifting arms 14a and 14b, are adjustably positionable by means of bolts 68 and holes 70, and include lifting lugs 72a and 72b that extend inwardly toward each other.

Stop lugs 74a and 74b are fixedly secured to respective ones of the lifting arms 14a and 14b, extend inwardly toward each other, and provide a locating means for abutting an edge 76 of a beehive brood chamber 78, as shown in FIG. 2.

The beehive lifting device 10 includes handles 80 for manually spreading the lifting arms 14a and 14b; and the beehive lifting device 10 includes a bolt 82 and holes 84 that cooperate to adjustably position the inner tube 22 in the outer tube 20, thereby selectably adjusting the height of the boom 16.

Referring now to FIG. 1, as shown by a small section of one of the clevis plates 60 being broken out, downward movement of the outer ends 64 of the lifting arms 14a and 14b are limited by the inner ends 56 of the lifting arms 14a and 14b abutting lower ends 58 of respective ones of the frame arms, 26a or 26b.

As seen in FIGS. 2 and 3: a first plane 86 intercepts the lifting lugs 72a and 72b; the lifting lugs 72a, 72b are spaced apart a first distance 88 in the first plane 86; the boom 16 is in a second plane 90 that is orthogonal to the first plane 86 and that bisects the first distance 88; the boom 16 is in a third plane 92 that is parallel to, and that is spaced apart from, the first plane 86; the folding frame 12 is in a fourth plane 94 that is orthogonal to the first plane 86, that is orthogonal to the second plane 90, and that is orthogonal to the third plane 92.

Further, the tubes 20 and 22 of the first frame member 18 are disposed along a first axis 96 that coincides with the intersection of the second plane 90 and the fourth plane 94.

Thus, it can be seen that the beehive lifting device 10 is foldable into a generally flat package that is disposed generally along the fourth plane 94 by folding the boom 16 downwardly against the tubes 20 and 22 of the first frame member 18, and folding the lifting arms 14a and 14b upwardly against respective ones of the frame arms, 26a and 26b.

Further, it can be seen that the lower ends 58 of the frame arms 26a and 26b are moveable inwardly, and that this movement of lower ends 58 of the frame arms 26a and 26b inwardly is effective to move the lifting arms 14a and 14b inwardly, so that the beehive lifting device 10 is foldable into a bundle that is disposed generally along the first axis 96, and generally around the first axis 96, as can be seen in FIGS. 4 and 5.

Referring now to FIG. 2, the lifting lugs 72a and 72b are centered from a surface 100 of the folding frame 12 by a second distance, or lug engaging distance, 102; and the lifting point 51 is centered from the surface 100 by a third distance, or lifting distance, 104 which is greater than the second distance 102. Thus, when a beehive 106, having a beehive brood chamber 78 and a plurality of beehive supers 108, is lifted by a force that is applied to the lifting point 51, a center of gravity 110 of the beehive 106 causes a rotational moment around the lifting point 51 that rotates the beehive lifting device 10 generally as shown in FIG. 2. Then the beehive 106 tilts backward toward the folding frame 12, resulting in a shift of the center of gravity 110 inward to a fourth distance 112, resulting in further rotation of the beehive lifting device 10, thereby providing stability to the beehive 106.

If it were not for friction between the lifting arms 14a and 14b and the beehive 106, the beehive would tilt backward against the surface 100 of the folding frame 12 as shown in FIG. 2. However, it has been found in practice that, although the initial swinging of the lifting mechanism 10 does cause a tilting backward of the beehive 106 toward the folding frame 12, friction between the lifting arms 14a and 14b stops this tilting action before the beehive 106 rests against the folding frame.

The tilting action of the beehive 106 provides a stabilizing action even if the beehive 106 does not rest against the folding frame 12, because the tilting is in the direction of stabilizing contact with the folding frame 12, and away from tilting off the beehive lifting device 10. This fact, combined with the stability that is provided by the lifting arms 14a and 14b resiliently engaging the beehive 106, provides excellent stability.

Thus the beehive lifting device 10 includes two means for stabilizing a beehive 106. One means is the tilting backward of the beehive 106, either toward, or against the folding frame 12; and the other means is the resilient clamping of the lifting arms 14a and 14b against the beehive 106 and the resultant friction therebetween.

The beehive 106 and the beehive lifting device 10 have a combined center of gravity 114; so the beehive lifting device 10 and the beehive 106 rotate until the combined center of gravity 114 is in a vertical plane 116 that intercepts the load lifting point 51. However, since the weight of the beehive lifting device 10 is relatively light in comparison to a beehive 106 that is loaded with honey, the combined center of gravity 114 is located quite close to the center of gravity 110 of the beehive 106. Therefore, it is correct to say that the beehive lifting device 10 and the beehive 106 rotate to a position wherein the center of gravity 110 of the beehive 106 is generally in a vertical plane 116 that intercepts the load lifting-point 51.

The beehive lifting device 10 includes two different means for resiliently reducing the first distance 88, for resiliently urging the lifting arms 14a and 14b inwardly, and for resiliently clamping the lifting arms 14a and 14b against sides 118 of the beehive 106. One means for resiliently urging the lifting arms 14a and 14b inwardly is the tension spring 44.

Referring now to FIG. 3, the other resilient means urging a reduction in the first distance 88 is a rotational moment which is applied to the frame arms 26a and 26b. This rotational moment is the product of a force vector 120, as caused by one half of the weight of a beehive 106 being applied to each of the lifting lugs 72a and 72b, and a fifth distance 122 which is the lateral distance from the pins 30 to respective ones of the lifting lugs 72a and 72b.

The folding frame 12, the equalizer links 34a and 34b, and the slide member 32 which serves as a guide means, cooperate to provide means for placing the load lifting point 51 substantially in the second plane 90 that is orthogonal to the first plane 86 and that bisects the first distance 88, for spacing the load lifting point 51 distal from the first plane 86, for selectively adjusting the first distance 88, and for maintaining the load lifting point 51 substantially in the second plane 90 irrespective of selective adjustments in the first distance 88.

Preferably, the lugs 72a and 72b engage handholds 124 (FIG. 2) in the beehives 106; but the lifting device 10 can be used to lift other loads, engaging handholds, or a bottom, or some other surfaces of an object, or a box type container.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

INDUSTRIAL APPLICABILITY

The present invention is applicable to lifting beehives and other box type devices, and depositing the beehive, or either load, onto a truck or another object, by engaging handholds, or by engaging the bottom of the box type object, and by lifting the beehive lifting device by a crane.

We claim:
1. A beehive lifting device (10) which comprises:
first (72a) and second (72b) lifting lugs intercepting a first plane (86), and being spaced apart a first distance (88) in said first plane;
a load attaching member (16) having a load lifting point (51) and an attaching portion (50);
folding frame means (12), being operatively attached to said lifting lugs, and being operatively attached to said attaching portion of said load attaching member, for placing said load lifting point substantially in a second plane (90) that is orthogonal to said first plane and that bisects said first distance, for spacing said load lifting point distally from said first plane, for selectively adjusting said first distance between said lifting lugs, and for maintaining said load lifting point substantially in said second plane irrespective of said selective adjustments to said first distance; and
said beehive lifting device includes resilient means for resiliently urging a reduction in said first distance.
2. A beehive lifting device (10) as claimed in claim 1 in which said resilient means comprises a spring (44).

3. A beehive lifting device (10) as claimed in claim 1 in which said resilient means comprises the weight of a beehive (106) on said lifting lugs (72).

4. A beehive lifting device (10) which comprises:

first (72a) and second (72b) lifting lugs intercepting a first plane (86), and being spaced apart a first distance (88) in said first plane;

a load attaching member (16) having a load lifting point (51) and an attaching portion (50);

folding frame means (12), being operatively attached to said lifting lugs, and being operatively attached to said attaching portion of said load attaching member, for placing said load lifting point substantially in a second plane (90) that is orthogonal to said first plane and that bisects said first distance, for spacing said load lifting point distally from said first plane, for selectively adjusting said first distance between said lifting lugs, and for maintaining said load lifting point substantially in said second plane irrespective of said selective adjustments to said first distance; and said beehive lifting device includes means (30, 54, 62) for folding said load attaching member (16), said folding frame means (12), and both of said lifting lugs generally into a single plane (94).

5. A beehive lifting device (10) as claimed in claim 4 in which said beehive lifting device includes means, comprising the weight of a beehive (106) applied to said lifting lugs (72a and 72b), for resiliently urging a reduction in said distance between lifting lugs.

6. A beehive lifting device (10) which comprises:

first (72a) and second (72b) lifting lugs intercepting a first plane (86), and being spaced apart a first distance (88) in said first plane;

a load attaching member (16) having a load lifting point (51) and an attaching portion (50);

folding frame means (12), being operatively attached to said lifting lugs, and being operatively attached to said attaching portion of said load attaching member, for placing said load lifting point substantially in a second plane (90) that is orthogonal to said first plane and that bisects said first distance, for spacing said load lifting point distally from said first plane, for selectively adjusting said first distance between said lifting lugs, and for maintaining said load lifting point substantially in said second plane irrespective of said selective adjustments to said first distance; and said beehive lifting device includes means (30, 54, 62) for folding said load attaching member (16), said folding frame means (12), and both of said lifting lugs (72a and 72b) into a bundle that is disposed generally along and generally around a first axis (96).

7. A beehive lifting device (10) as claimed in claim 6 in which said beehive lifting device includes means, comprising the weight of a beehive (106) applied to said lifting lugs, for resiliently urging a reduction in said distance (88) between said lifting lugs (72a and 72b).

8. A beehive lifting device (10) which comprises first (14a) and second (14b) lifting arms that are spaced apart and that include first (56) and second (64) ends;

first (72a) and second (72b) lifting lugs being operatively attached to respective ones of said lifting arms distally from said first ends thereof, each projecting inwardly toward the other of said lifting arms, both intercepting a first plane (86), and being spaced apart a first distance (88) in said first plane;

a boom (16) having a load lifting point (51), and having an attaching portion (50) that is distal from said load lifting point; and folding frame means (12), being operatively secured to said first ends of said lifting arms, and being operatively secured to said attaching portion of said boom, for placing said load lifting point substantially in a second plane (90) that is orthogonal to said first plane and that bisects said first distance, for spacing said load lifting point distally from said first plane, for selectively adjusting said first distance between said lifting lugs, and for maintaining said load lifting point substantially in said second plane irrespective of said selective adjustments to said first distance.

9. A beehive lifting device (10) as claimed in claim 8, in which said beehive lifting device includes resilient means for resiliently urging a reduction in said first distance.

10. A beehive lifting device (10) as claimed in claim 8 in which said beehive lifting device includes means (54) for folding said boom (16) toward, and substantially against, said folding frame means (12); and said beehive lifting device includes means (62) for folding both of said lifting arms (14a and 14b) toward, and substantially against, said folding frame means (12); whereby said beehive lifting device is foldable generally into a single plane (94).

11. A beehive lifting device (10) as claimed in claim 10 in which said beehive lifting device includes means, comprising the weight of a beehive (106) applied to said lifting lugs (72a and 72b), for resiliently urging a reduction in said distance (88) between said lifting lugs.

12. A beehive lifting device (10) as claimed in claim 10 in which said beehive lifting device includes stabilizing means for tilting a beehive (106) toward said folding frame means (12).

13. A beehive lifting device (10) as claimed in claim 8 in which said beehive lifting device includes means (30, 54, 62) for folding said boom (16), said folding frame means (12), and both of said lifting arms (14a and 14b) into a bundle that is disposed generally around a first axis (96).

14. A beehive lifting device (10) as claimed in claim 8 in which said beehive lifting device includes stabilizing means for tilting a beehive (106) toward said folding frame means (12).

15. A beehive lifting device (10) as claimed in claim 14 in which said beehive lifting device includes means, comprising the weight of a beehive (106) applied to said lifting lugs (72a and 72b), for resiliently urging a reduction in said distance (88) between said lifting lugs, and for resiliently pressing said lifting arms (14a and 14b) against said beehive; whereby friction between said lifting arms and said beehive cooperates with said tilting of said beehive for stabilizing said beehive.

16. A beehive lifting device (10) which comprises first (14a) and second (14b) lifting arms that are spaced apart and that include first (56) and second (84) ends;

first (72a) and second (72b) lifting lugs being operatively attached to respective ones of said lifting arms distal from said first ends thereof, each projecting inwardly toward the other of said lifting arms, both intercepting a first plane (86), and being spaced apart a first distance (88) in said first plane;

a boom (16) having a load lifting point (51), and having an attaching portion (50) that is distal from said load lifting point; and folding frame means (12), comprising a first frame member (18) that is operatively attached to said attaching portion of said boom, and comprising first (26a) and second (26b) frame arms with upper ends (28) that are pivotally attached to said first frame member and with lower ends (58) that are operatively attached to respective ones of said first ends of said lifting arms, for placing said load lifting point substantially in a second plane (90) that is orthogonal to said first plane and that bisects said first plane, for spacing said load lifting point distally from said first plane, for selectively adjusting said first distance between said lifting lugs, and for maintaining said load lifting point substantially in said second plane irrespective of said selective adjustments in said first distance.

17. A beehive lifting device (10) as claimed in claim 16 in which said folding frame means (12) includes first (34a) and second (34b) equalizer links having upper ends (40), having lower ends (36) that are pivotally attached to respective ones of said frame arms (26a and 26b) distally from said upper ends (28) thereof;

said folding frame means includes guiding means (32) for guiding said upper ends of said equalizer links orthogonally to said first plane (86); and said means for maintaining said load lifting point (51) substantially in said second plane (90) comprises said equalizer links and said guiding means.

18. A beehive lifting device (10) as claimed in claim 17 in which said first frame member (18) includes an elongated member (20) that is disposed substantially along a first axis (96) that is substantially orthogonal to said first plane (86), and that is disposed substantially in said second plane; and said guiding means includes a slide member (32) that guidingly engages said elongated member.

19. A beehive lifting device (10) as claimed in claim 18 in which said beehive lifting device includes a spring (44) that is disposed generally parallel to said first axis (96), that is attached to said slide member (32), that is operatively attached to said first frame member (18), and that is in tension when said first distance (88) between said lugs (72a and 72b) is a maximum; whereby said spring resiliently urges a reduction in said first distance.

20. A beehive lifting device (10) as claimed in claim 17 in which said beehive lifting device includes means (54) for folding said boom (16) toward, and substantially against, said folding frame means (12); and said beehive lifting device includes means (30) for folding both of said lifting arms (14a and 14b) toward, and substantially against, said folding frame means; whereby said beehive lifting device is foldable generally into a single plane (94).

21. A beehive lifting device (10) as claimed in claim 20 in which said beehive lifting device includes means, comprising the weight of a beehive (106) applied to said lifting lugs (72a and 72b), for resiliently urging a reduction in said distance (88) between lugs.

22. A beehive lifting device (10) as claimed in claim 20 in which said first (72a and second 72b) lifting lugs are centered at a lug engaging distance (102) from said folding frame means (12);

said lifting point (51) is disposed at a lifting distance (104) from said folding frame means; and said lifting distance is greater than said lug engaging distance; whereby the load of a beehive (106) that is centered with respect to said lug engaging distance from said folding frame means is effective to rotate said lifting arms (14a and 14b) and said folding frame means to positions wherein the center of gravity (110) of said beehive is disposed generally along a vertical plane (116) that intercepts said lifting point, and whereby said beehive is stabilized by being tilted back toward said folding frame means.

23. A beehive lifting device (10) as claimed in claim 17 in which said beehive lifting device includes means for folding said boom (16) toward, and substantially against, said folding frame means (12);

said lifting device includes means for folding both of said lifting arms (14a and 14b) toward, and substantially against, said folding frame means; and said beehive lifting device includes means, comprising said folding of said boom, said folding of both of said lifting arms, and said means (62) for selectively adjusting said distance (88) between said lifting lugs (72a and 72b), for folding said lifting device into a bundle that is disposed generally along and around a single axis (96).

24. A beehive lifting device (10) as claimed in claim 17 in which said first (72a) and second (72b) lifting lugs are centered at a lug engaging distance (102) from said folding frame means (12);

said lifting point (51) is disposed at a lifting distance (104) from said folding frame means; and said lifting distance is greater than said lug engaging distance; whereby the load of a beehive (106) that is centered with respect to said lug engaging distance from said folding frame means is effective to rotate said lifting arms (14a and 14b) and said folding frame means to positions wherein the center of gravity (110) of said beehive is disposed generally along a vertical plane (116) that intercepts said lifting point, and whereby said beehive is stabilized by being tilted back toward said folding frame means.

25. A beehive lifting device (10) as claimed in claim 24 in which said beehive lifting device includes means, comprising the weight of a beehive (106) applied to said lifting lugs (72a and 72b), for resiliently urging a reduction in said distance (88) between said lifting lugs, and for resiliently pressing said lifting arms (14a and 14b) against said beehive; whereby friction between said lifting arms and said beehive cooperates with said tilting back of said beehive to provide means for stabilizing said beehive.

* * * * *